(12) United States Patent
Dueckinghaus et al.

(10) Patent No.: US 11,639,730 B2
(45) Date of Patent: May 2, 2023

(54) LOADING VEHICLE STRUCTURE

(71) Applicant: CLAAS Material Handling GmbH, Harsewinkel (DE)

(72) Inventors: Heinrich Dueckinghaus, Bielefeld (DE); Christian Ostfechtel, Herzebrock-Clarholz (DE); Markus Wiefel, Beelen (DE)

(73) Assignee: CLAAS Material Handling GmbH, Harsewinkel (DE)

( * ) Notice: Subject to any disclaimer, the term of this patent is extended or adjusted under 35 U.S.C. 154(b) by 886 days.

(21) Appl. No.: 16/527,600

(22) Filed: Jul. 31, 2019

(65) Prior Publication Data

US 2020/0072255 A1 Mar. 5, 2020

(30) Foreign Application Priority Data

Aug. 31, 2018 (DE) .......................... 102018121287.9

(51) Int. Cl.
| | | |
|---|---|---|
| *F15B 21/044* | (2019.01) | |
| *B66F 9/22* | (2006.01) | |
| *F16H 61/4174* | (2010.01) | |
| *F16H 57/04* | (2010.01) | |
| *B66F 9/065* | (2006.01) | |
| *E02F 3/42* | (2006.01) | |

(Continued)

(52) U.S. Cl.
CPC ............ *F15B 21/044* (2013.01); *A01D 43/08* (2013.01); *A01D 69/03* (2013.01); *B66F 9/0655* (2013.01); *B66F 9/22* (2013.01); *E02F 3/286* (2013.01); *E02F 3/422* (2013.01); *F16H 57/0438* (2013.01); *F16H 61/4174* (2013.01); *B62D 7/06* (2013.01); *B66F 9/07568* (2013.01)

(58) Field of Classification Search
CPC . F15B 21/044; F16H 57/0438; F16H 61/4174
See application file for complete search history.

(56) References Cited

U.S. PATENT DOCUMENTS 3,207,244 A * 9/1965 Becker ................ F16H 61/4139
180/6.48
2014/0083290 A1 3/2014 Larson

FOREIGN PATENT DOCUMENTS

DE 102011009044 A1 7/2012
DE 102013101869 A1 8/2014
(Continued)

OTHER PUBLICATIONS

European Search Report dated Dec. 17, 2019 issued in the corresponding EP Application Serial No. 19180433 (with English translation of relevant parts).

*Primary Examiner* — Kenneth Bomberg
*Assistant Examiner* — Matthew Wiblin
(74) *Attorney, Agent, or Firm* — Collard & Roe, P.C.

(57) ABSTRACT

A device for the deaeration of a hydraulic fluid of a hydraulic system has at least one hydraulic motor arrangement and a hydraulic fluid storage which is hydraulically coupled with this hydraulic motor arrangement. A suction device for sucking out the hydraulic fluid is associated with the at least one hydraulic motor arrangement such that the suction device guides hydraulic fluid out of the hydraulic motor arrangement into the hydraulic fluid storage by means of vacuum pressure ($\Delta p$). The suction device is constructed as a jet pump and is integrated in the return line between the hydraulic motor arrangement and hydraulic fluid storage.

11 Claims, 4 Drawing Sheets

(51) Int. Cl.
*A01D 69/03* (2006.01)
*E02F 3/28* (2006.01)
*A01D 43/08* (2006.01)
*B66F 9/075* (2006.01)
*B62D 7/06* (2006.01)

(56) References Cited

FOREIGN PATENT DOCUMENTS

| DE | 102015012493 A1 | * | 3/2017 | ............ F15B 21/044 |
| EP | 2686265 A1 | | 1/2014 | |
| EP | 3073157 A1 | | 9/2016 | |
| FR | 3055936 A1 | * | 3/2018 | ............. B64C 27/12 |
| GB | 2161784 A | | 1/1986 | |

\* cited by examiner though the motive nozzle is branched off from the pressurized portion of the hydraulic system, the mixing chamber is connected to the return line of the hydraulic motor arrangement, and the diffuser is connected to the return line to the hydraulic fluid storage.

LOADING VEHICLE STRUCTURE

CROSS-REFERENCE TO RELATED APPLICATIONS

This application claims priority under 35 USC 119 of German Application No. DE 102018121287.9, filed on Aug. 31, 2018, the disclosure of which is herein incorporated by reference.

BACKGROUND OF THE INVENTION

The invention is directed to an oil deaeration system for hydraulic circuits and to a use of a system of this kind in loading vehicles with at least one adjustable length lift arm.

Loading vehicles of this type are described in EP 2 686 265. The loading vehicle which is constructed as a telescoping loader comprises a loading device which is formed as a telescoping carrying arm and which is moveable between a lower working position close to the ground and a plurality of upper work positions away from the ground. The loading device formed as telescoping arm is swivelable at one end around a swivel shaft extending transverse to the driving direction of the telescoping loader by means of at least one lift cylinder. At the same time, the front segment of the telescoping carrying arm can be moved in and out independent from the swiveling movement or so as to be coupled with the swiveling movement. On the front side, the carrying arm accepts a loading tool which is constructed as a loading fork. The loading tool is generally articulated at the telescoping carrying arm so as to be swivelably moveable. With regard to the articulation of the telescoping carrying arm at the loading vehicle, solutions which additionally allow a rotation of the telescoping arm around a vertical rotational axis are also known from GB 2161784.

The hydraulic systems used in loading vehicles of this kind as well as in tractors and other work machines comprise, among other components, at least one hydraulic pump, a sump or a hydraulic reservoir or tank, hydraulic functions such as, for example, actuators or cylinders, and valve devices or control valves which control the communication between the hydraulic pump, the sump and the hydraulic function. Hydraulic reservoirs or tanks are used to store oil or a hydraulic fluid and to give the hydraulic fluid time to defoam, deaerate or degas. When the liquid is not deaerated sufficiently, the hydraulic pump is susceptible to cavitation damage and failures. Hydraulic fluid mixed with air or gas in a hydraulic system can cause noises or can bring about a jerky operation of the hydraulic function and cause heat generation and can result in a reduced life of the components. For example, in some hydraulic systems of tractors or loading vehicles, the hydraulic fluid can be at least partially atomized when it flows out of a control valve outlet at an excessive velocity, when the hydraulic fluid flows back to the sump or communicates with the sump. This causes the hydraulic fluid in the sump to be mixed with air or to foam.

Further, the hydraulic systems of traction drives in mobile work machines are usually completely filled with hydraulic fluid so as to counteract foaming. In order to improve the efficiency of such hydraulic systems, the housings of the hydrostatic components should not be filled with hydraulic oil so as to prevent splashing, which impairs efficiency.

In order to avoid these problems, it is suggested, inter alia, in EP 3 073 157 that a suction device be associated with the hydraulic motor arrangement for sucking out the hydraulic fluid in such a way that the suction device guides hydraulic fluid from the hydraulic motor arrangement into the hydraulic fluid storage by means of vacuum pressure so that a satisfactory oil deaeration is achieved even in high-speed hydraulic motor arrangements. However, the solution described in EP 3 073 157 has the disadvantage of a costly construction and is therefore cost-intensive and, moreover, has an increased installation space requirement.

SUMMARY OF THE INVENTION

Therefore, it is the object of the invention to avoid the above-described disadvantages of the prior art and, in particular, to provide an efficient oil deaeration system having a simple construction.

This object is accomplished according to the invention by a device for the deaeration of a hydraulic fluid of a hydraulic system, the hydraulic system comprising a hydraulic motor arrangement and a hydraulic fluid storage which is hydraulically coupled with this hydraulic motor arrangement, and a suction device for sucking out hydraulic fluid is associated with the at least one hydraulic motor arrangement such that the suction device guides hydraulic fluid out of the hydraulic motor arrangement into the hydraulic fluid storage by means of vacuum pressure ($\Delta p$), and the device is so constituted that the suction device is constructed as a jet pump and is integrated in the return line between the hydraulic motor arrangement and hydraulic fluid storage.

A space-saving, efficiently operating oil suction is achieved according to the invention in that the jet pump comprises at least one motive nozzle, a mixing chamber and a diffuser, wherein the motive medium passing through the motive nozzle is branched off from the pressurized portion of the hydraulic system, the mixing chamber is connected to the return line of the hydraulic motor arrangement, and the diffuser is connected to the return line to the hydraulic fluid storage.

In an advantageous further development of the invention, the motive medium passing through the motive nozzle is branched off from the preloaded scavenging oil of the hydraulic motor arrangement so that additional elements for building up the pressure in the motive medium can be dispensed with.

It is ensured that an oil suction adapted to any driving situation is possible in that the sucking out of the hydraulic fluid by a jet pump is independent from the rotational direction of the hydraulic motor arrangement and, therefore, independent from the driving direction of a loading vehicle or other agricultural work machine comprising the hydraulic motor arrangement.

An efficient segregation of air bubbles and hydraulic fluid which economizes on installation space is achieved in an advantageous further development of the invention when the suction line is coupled with an outlet tube which is integrated in the hydraulic fluid storage and which is arranged in the hydraulic fluid storage so as to be inclined in vertical direction. These effects are reinforced when the outlet tube has orifices for the hydraulic fluid to pass through and has an air outlet orifice on the upper side.

Further, in an advantageous configuration, the suction device according to the invention is so constituted that it can also be used in a versatile manner for sucking out hydraulic oil from dual motor arrangements.

A simply designed configuration also results when the hydraulic motor arrangement is connected to the hydraulic fluid storage via an air intake line.

The vacuum pressure in the system according to the invention can be realized in a simple construction in that the air intake line comprises a check valve whose throughput is unblocked depending on a defined vacuum pressure in the hydraulic motor arrangement. In a preferred configuration, the check valve is spring-loaded to require an opening pressure of up to 1 bar, preferably 0.5 bar or 0.6 bar. In this vacuum pressure range, small-size bubbles contained in the hydraulic fluid combine very efficiently to form larger air bubbles which can ultimately be separated from the hydraulic fluid in a more efficient, simpler manner.

The possibilities for use of the oil suction according to the invention are also multiplied when the loading vehicle or other, in particular, agricultural work machine comprises a fan and a fan drive associated with the fan, and a jet pump is associated with the fan drive, which jet pump diverts a partial stream from the fan hydraulic circuit and guides this partial stream to a cooling device so that, in addition to the oil deaeration, a more efficient cooling of the hydraulic medium is also brought about. In this context, it is advantageous with respect to a simple structural implementation when the hydraulic system associated with the loading vehicle or other agricultural work machine comprises a plurality of jet pumps and each of the jet pumps draws its motive medium from the preloaded hydraulic fluid of the fan drive.

In a further advantageous configuration, the diaphragm of every jet pump is dimensioned to be small such that a sufficiently high pressure of the motive medium is ensured even at a low rotational speed of the drive motor of the loading vehicle or other, in particular, agricultural work machine.

A wide range of uses results when the suction device according to the invention is used in loading vehicles or other agricultural work machines such as combine harvesters, chopper-type forage harvesters or tractors which are constructed as telescoping loaders, forklifts or wheel loaders.

BRIEF DESCRIPTION OF THE DRAWINGS

Further advantageous will be described in the following with reference to an embodiment example shown in the figures. In the drawings.

DETAILED DESCRIPTION OF THE EMBODIMENTS

Figure 1:
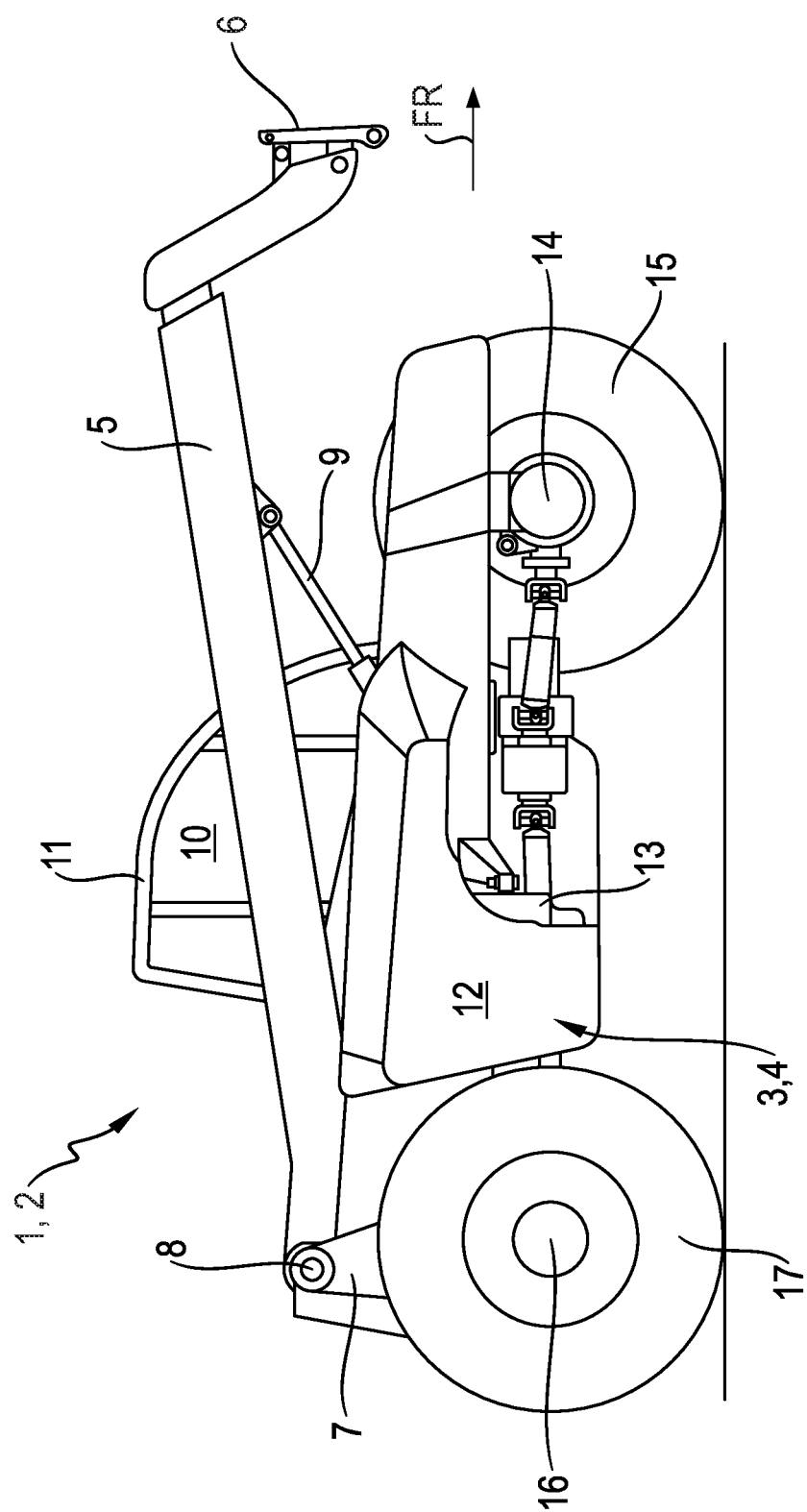
FIG. 1 shows a side view of the loading vehicle according to the invention.

FIG. 1 schematically shows a loading vehicle 1 constructed as a telescoping loader 2. In a central position, the carrying structure 4 which is constructed as carrying frame 3 receives a telescoping lift arm 5 in a manner known per se, and a tool adapter 6, known per se, is associated with the telescoping lift arm 5 on the front side. In its rear area, the lift arm 5 is supported so as to be swivelably moveable by at least one swivel shaft 8 arranged in supporting flanges 7 transverse to driving direction FR. One or more lift cylinders 9 which allow the lift arm 5 to swivel around the above-mentioned swivel shaft 8 when pressure is introduced or removed are associated with the lift arm 5 on the bottom side in order to realize the swiveling movement. The telescopic retraction and extension of the lift arm 5 is realized by means of further lift cylinders in a manner which is known per se and therefore not elaborated further. Because of its central arrangement, the telescoping lift arm 5 divides the loading vehicle 1 into a cab-side area 10 in which the driver's cab 11 is associated with the carrying frame 3 and a drive-side area 12 in which the drive motor 13 is received by the carrying frame 3. Further, in a manner known per se, the carrying frame 3 receives a front undercarriage 15 formed by a front axle 14 and a rear undercarriage 17 formed by a rear axle 16.

Figure 2:
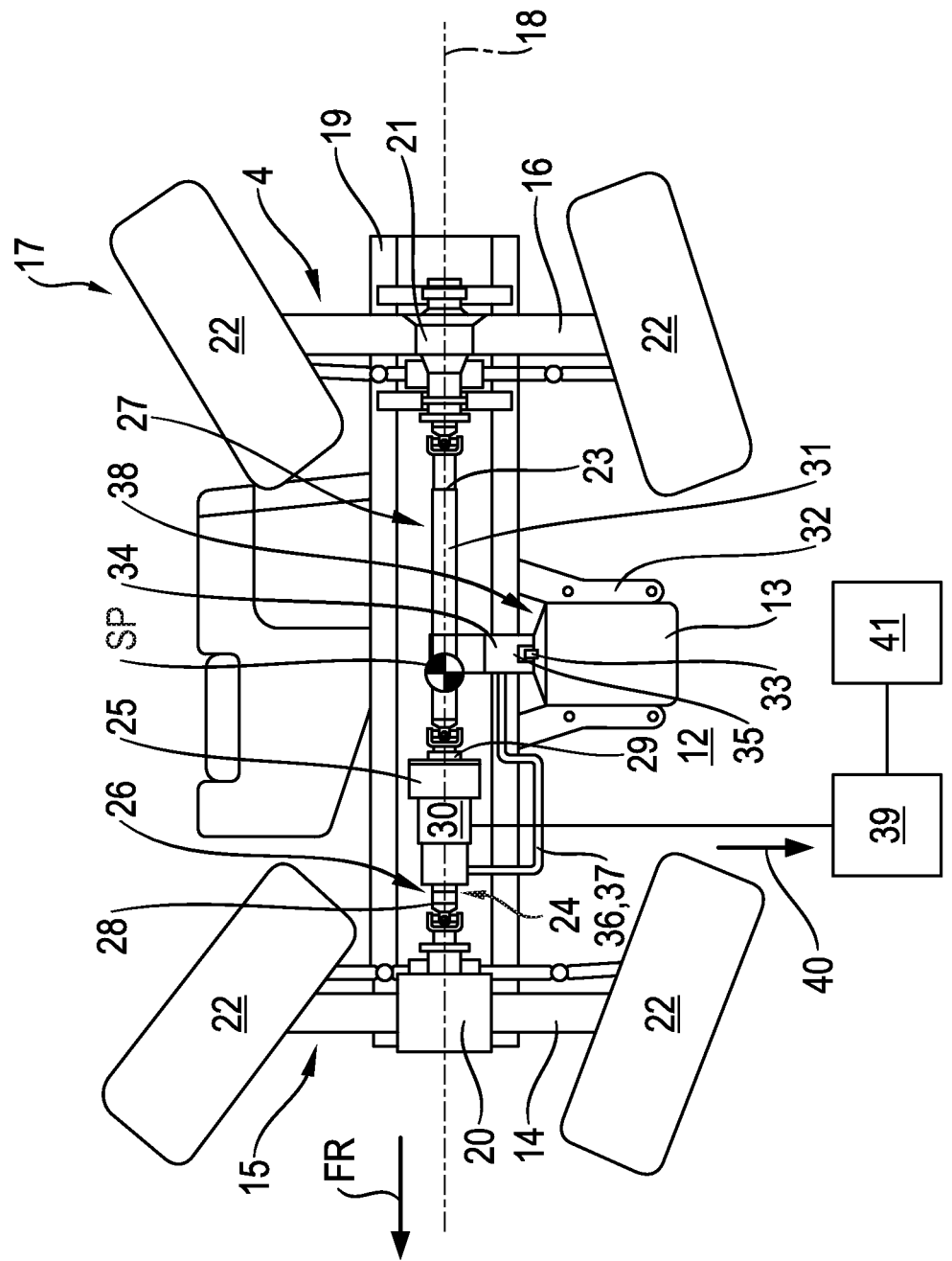
FIG. 2 shows the loading vehicle according to FIG. 1 viewed from the bottom.

According to FIG. 2, the carrying structure 4 comprises a longitudinal member 19 which extends in a longitudinal direction 18 of the loading vehicle 1 and to which the front undercarriage 15 and rear undercarriage 17 are fastened. In the embodiment example shown here, both the front axle 14 and rear axle 16 receive, respectively, a differential gear unit 20, 21 which is constructed as to be either unlockable or rigid with respect to the drive of the running wheels. Each of the differential gear units 20, 21 is coupled to a central gear unit 25 via mechanical partial drivetrains 23, 24. In the simplest case, the partial drivetrains 23, 24 may be constructed as articulated shafts 26, 27, known per se. Within the framework of the invention, the partial drivetrains 23, 24 can also comprise hydraulic components for transmitting driving power. In the embodiment example shown here, the central gear unit 25 has two output shafts 28, 29 which face in a longitudinal direction 18 of the vehicle and are drivingly connected to the respective articulated shaft 26, 27.

The central gear unit 25 is connected to a hydraulic motor arrangement 30, which is to be described further, for driving the central gear unit 25. The hydraulic motor arrangement 30 is flanged to the central gear unit 25 via screw connections in a manner which is known per se and therefore not shown. In order to make optimal use of any existing free space at the loading vehicle 1, the central gear unit 25 is fixed in the cab-side area 10 at least partially beneath the driver's cab 11 and in proximity to the front axle 14 at the carrying structure 4. In order to reduce soiling and to prevent contact with the ground, the drivetrain 31 and central gear unit 25 are at least partially enclosed by the longitudinal member 19 of the carrying frame 3. It lies within the scope of the invention that the drivetrain 31 and the central gear unit 25 can also be completely enclosed by the longitudinal member 19. In this case, there is virtually no wear due to soiling or impacts.

In a manner according to the invention, the carrying structure 4 further receives the drive motor 13 which is supported at the longitudinal member 19 of the carrying frame 3 in the embodiment example shown here via a supporting frame 32. The drive motor 13 occupies a virtually central position between the undercarriages 15, 17 of the telescoping loader 2. At the same time, it is arranged so as to be offset in longitudinal direction 18 of the telescoping loader 2 relative to the central gear unit 25 in the drive-side area 12 of the telescoping loader 2. In this way, the central gear unit 25 and the drive motor 13 are alternately associated with the drivetrain 31 of the undercarriages 15, 17. This has the advantage in particular that the drive units 25, 13 can be arranged in proximity to the longitudinal member 19 of the carrying frame 3, which results in a virtually central position of the center of gravity SP between undercarriages 15, 17 and, therefore, in high driving stability. The installation position of the drive motor 13 extends transverse to the longitudinal direction 18 of the telescoping loader 2 so that its output shaft 33 faces in direction of the drivetrain 31 of the undercarriages 15, 17. In a manner according to the invention, the output shaft 33 of the drive motor 13 receives a hydraulic pump arrangement 34 which is flanged to the drive motor 13 in the simplest case by means of screw connections and is driven by the drive motor 13 via the output shaft 33 and a drive connection piece 35 associated with the hydraulic pump arrangement 34. The hydraulic pump arrangement 34 of the drive motor 13 and the hydraulic motor arrangement 30 of the central gear unit 25 are connected to one another via a line system 36 for transferring hydraulic medium. In order to achieve greater flexibility in arranging the various drive units 13, 25, 30, 34, the line system 36 advantageously comprises hose lines 37. In order to achieve a low position of the center of gravity SP, it is advantageous when the drive units 13, 25, 30, 34 are arranged below the longitudinal member 19. A compact arrangement of the entire drive structure of the loading vehicle is made possible in that the drive unit 38 formed by the drive motor 13 and the associated hydraulic pump 34 is arranged in the drive-side area 12 in such a way that the drive unit 38 extends at least partially into the area of the drivetrain 31 of the undercarriages 15, 17. Further, the suction device 39 according to the invention which moves hydraulic fluid 40 out of the hydraulic motor arrangement 30 into a hydraulic fluid storage 41 by means of vacuum pressure in a manner to be described more fully is associated with the hydraulic motor arrangement 30 coupled with the central gear unit 25.

Figure 3:
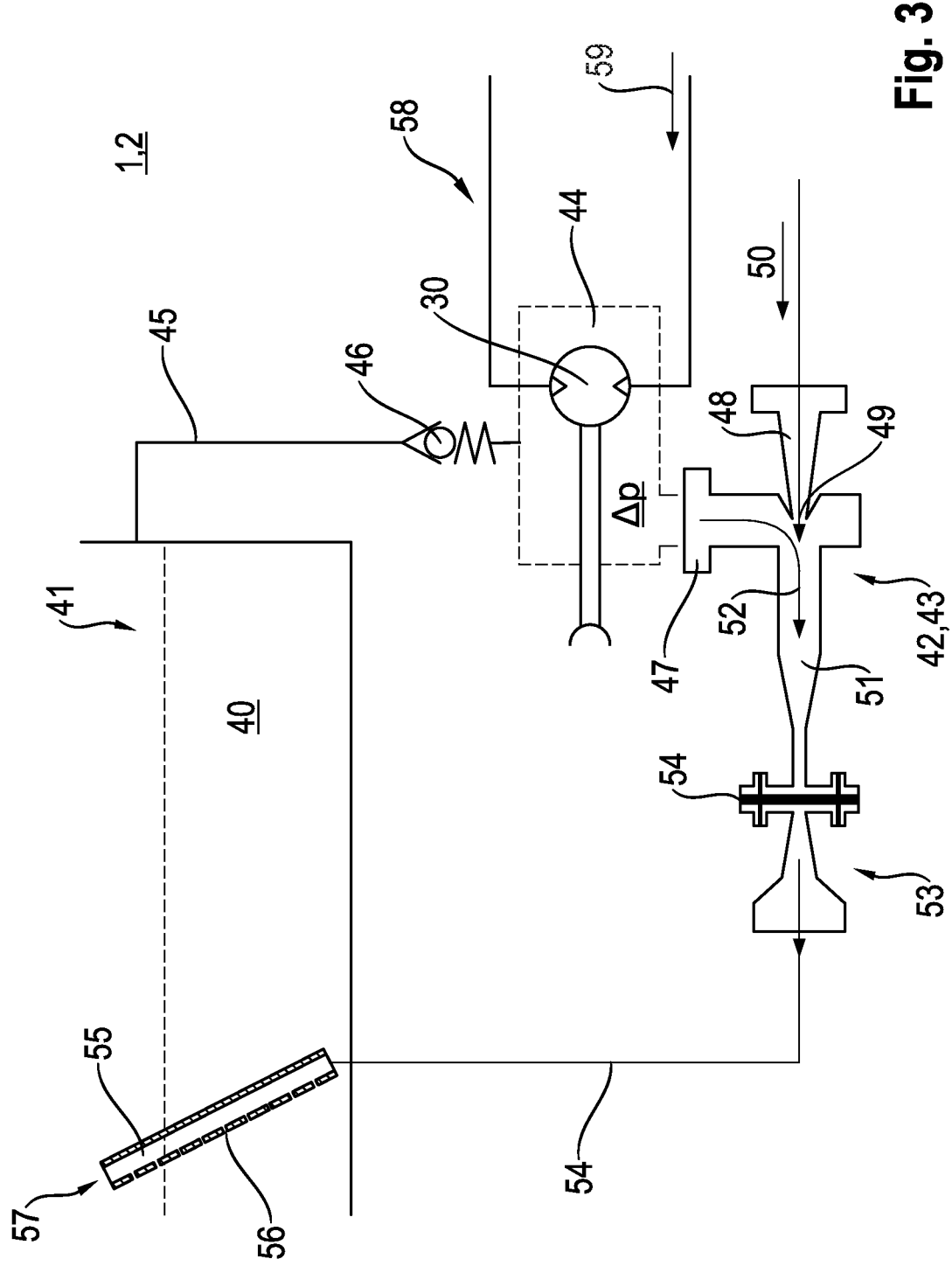
FIG. 3 shows a schematic view of the suction device according to the invention.

FIG. 3 shows in detail the suction device 43 which is constructed according to the invention as jet pump 42. The hydraulic motor arrangement 30 which is constructed in the present instance in exemplary manner as a single-motor arrangement is integrated in a housing 44. Housing 44 is connected to the hydraulic fluid storage 41 via an air intake line 45. The hydraulic fluid storage 41 is only partially filled with hydraulic fluid 40. At the other end, the air intake line 45 opens into a check valve 46 which is associated with housing 44 of hydraulic motor arrangement 30 and whose throughput is unblocked depending on a defined vacuum pressure in housing 44. The check valve 46 is spring-loaded and realizes an opening pressure of up to 1 bar, preferably 0.5 bar or 0.6 bar.

According to the invention, the suction device 43 for generating the vacuum pressure Δp in the housing 44 is formed by a jet pump 42. The jet pump 42 comprises a suction connection 47 which is directly flanged to housing 44. The suction connection 47 is penetrated on one side by a motive nozzle 48. There is a narrowing formed as diaphragm 49 in the transitional area between the motive nozzle 48 and the wall of the suction connection 47. The motive medium 50, generally pressurized hydraulic oil, is supplied to the motive nozzle 48 at the free end thereof. Opposite the motive nozzle 48, a mixing chamber 51 is formed integral with the suction connection 47. In the mixing chamber 51, the motive medium 50 impinges on the hydraulic oil 52 which is to be sucked out by means of vacuum pressure Δp. Due to the high velocity with which the motive medium 50 is pressed through the diaphragm 49 of the motive nozzle 48, a suction action is initiated on the hydraulic oil 52 flowing through the suction connection 47 in the area of the mixing chamber 51 based on the Venturi principle. This suction action finally results in the vacuum pressure Δp according to the invention. The free end of the mixing chamber 51 is connected to a diffuser 53 which is detachable and exchangeable via a flange connection 54. It lies within the scope of the invention that the diffuser 53 can also be formed directly integral with mixing chamber 51. The mixture of sucked out hydraulic oil 52 and motive medium 50 exits from the jet pump 42 at the end of the diffuser 53 and is supplied to the hydraulic fluid storage 41 via a return line 54. The return line 54 opening into the hydraulic fluid storage 41 is coupled at its storage-side end with an outlet tube 55 which is arranged in the hydraulic fluid storage 41 so as to be inclined in vertical direction. The outlet tube 55 has orifices 56 through which the sucked out hydraulic fluid can exit into the hydraulic fluid storage 41. On the upper side, the outlet tube 55 has a further orifice 57 through which the air bubbles entrained in the oil can be eliminated. It is ensured that the small air bubbles contained in the foamed hydraulic fluid 52 combine to form larger air bubbles before they can be separated and eliminated in a simple manner from the hydraulic fluid 50, 52 when passing through the outlet tube 55 in that housing 44 of the hydraulic motor arrangement 30 is permanently under vacuum pressure Δp during the operation of the loading vehicle 1 constructed as telescoping loader 2. This deaeration effect is especially significant particularly in high-speed hydraulic motor arrangements because the latter have a greater tendency to form bubbles.

In a preferred configuration, the motive medium 50 which passes through the motive nozzle and is branched off from the pressurized portion of the hydraulic system 58 can be branched off from the preloaded scavenging oil 59 of the hydraulic motor arrangement 30. Further, the sucking out of hydraulic fluid 52 by means of jet pump 42 is independent from the rotational direction of the hydraulic motor arrangement 30 and therefore independent from the driving direction FR of a loading vehicle comprising the hydraulic motor arrangement 30.

Figure 4:
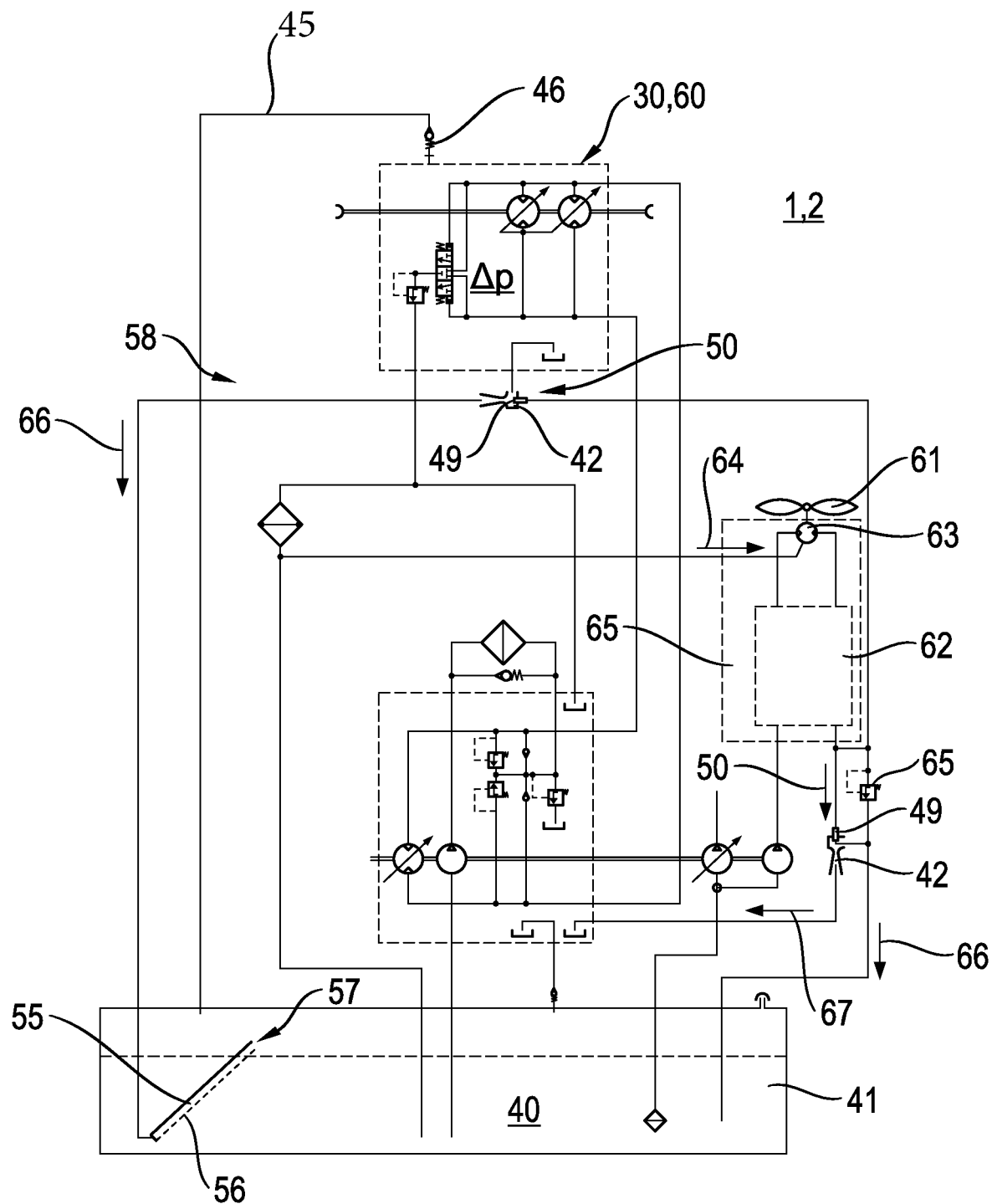
FIG. 4 shows a further embodiment form of the suction device according to the invention.

Finally, FIG. 4 shows further advantageous configurations of the invention. First, the hydraulic motor arrangement 30 can be constructed as a dual motor arrangement 60, and the jet pump 42 according to the invention is then associated with the dual motor arrangement 60 in the manner described above.

Loading vehicles 1 constructed as telescoping loaders 2 are generally driven by combustion engines which cause considerable heat generation. In addition, the hydraulic elements associated with the hydraulic system 58 lead to a considerable heating of the hydraulic fluid 40 in operation. In order to dissipate the heat generated in these various ways, a fan 61 is associated with the loading vehicle 1 and a fan hydraulic circuit 62 is associated with the fan 61. The fan 61 and fan hydraulic circuit 62 cooperate to produce a cooling air stream which effects a cooling of the hydraulic fluid 40 and of the cooling water which cools an internal combustion engine in a cooling device which is known per se and is therefore not shown. The fan 61 is generally driven hydraulically, and the hydraulic motor 63 associated with it is supplied with hydraulic fluid 64 depending upon the rotational speed of the internal combustion engine. In order for there to be sufficient hydraulic medium available at all times regardless of the rotational speed of the internal combustion engine, the hydraulic fluid 64 which is supplied to the hydraulic motor 63 of the fan 61 is preloaded by means of pressure limiting valve 65. In an advantageous further development of the invention, a further jet pump 42 is associated with the fan drive 65, and this further jet pump 42 sucks out a partial stream 67 from the hydraulic oil 66 flowing back to the hydraulic fluid storage 41 by means of the Venturi effect in the above-described manner and supplies this partial stream 67 to the cooling device, for reducing the oil temperature. A simply designed layout results when all of the jet pumps 42 integrated in the hydraulic system 58 draw their motive medium 50 from the hydraulic fluid 64 which is preloaded by the above-described pressure limiting valve 65. Further, the diaphragm 49 of each jet pump 42 is dimensioned to be small such that a sufficiently high pressure of the motive medium 50 is ensured even at a low speed of the drive motor of the loading vehicle.

Further, the loading vehicle can also be constructed as a wheel loader or other agricultural work machine, particularly a chopper-type forage harvester, combine harvester or tractor.

REFERENCE NUMERALS

1 loading vehicle
2 telescoping loader
3 carrying frame
4 carrying structure
5 lift arm
6 tool adapter
7 supporting flange
8 swivel shaft
9 lift cylinder
10 cab-side area
11 driver's cab
12 input-side area
13 drive motor
14 front axle
15 front undercarriage
16 rear axle
17 rear undercarriage
18 longitudinal direction
19 longitudinal member
20 differential gear unit
21 differential gear unit
22 running wheels
23 partial drivetrain
24 partial drivetrain
25 central gear unit
26 articulated shaft
27 articulated shaft
28 output shaft
29 output shaft
30 hydraulic motor arrangement
31 drivetrain
32 supporting frame
33 output shaft
34 hydraulic pump
35 drive connection piece
36 line system
37 hose lines
38 drive unit
39 suction device
40 hydraulic fluid
41 hydraulic fluid storage
42 jet pump
43 suction device
44 housing
45 air intake line
46 check valve
47 suction connection
48 motive nozzle
49 diaphragm
50 motive medium
51 mixing chamber
52 hydraulic fluid
53 diffuser
54 return line
55 outlet tube
56 orifice
57 orifice
58 hydraulic system
59 scavenging oil
60 dual motor
61 fan
62 fan hydraulic circuit
63 hydraulic motor
64 hydraulic fluid
65 fan drive
66 hydraulic oil
67 partial stream

What is claimed is:

1. A device for the deaeration of a hydraulic fluid of a hydraulic system of a loading vehicle or agricultural work machine, comprising:
    at least one hydraulic motor arrangement,
    a hydraulic fluid storage which is hydraulically coupled with the at least one hydraulic motor arrangement, and
    a suction device configured for sucking out the hydraulic fluid, the suction device being associated with the at least one hydraulic motor arrangement such that the suction device guides hydraulic fluid out of the at least one hydraulic motor arrangement into the hydraulic fluid storage by means of vacuum pressure ($\Delta p$),
    wherein the suction device is constructed as a jet pump and is integrated in a return line between the at least one hydraulic motor arrangement and the hydraulic fluid storage,
    wherein the jet pump comprises a suction connection, at least one motive nozzle, a mixing chamber and a diffuser, wherein motive medium passing through the at least one motive nozzle is branched off from a pressurized portion of the hydraulic system, the mixing chamber is connected to a return line of the at least one hydraulic motor arrangement, and the diffuser is connected to a return line of the hydraulic fluid storage,
    wherein the suction connection is directly flanged to a housing of the hydraulic motor arrangement,
    wherein a transition area between the motive nozzle and a wall of the suction connection has a narrowing in the form of a diaphragm,
    wherein the mixing chamber is formed integrally with the suction connection, opposite the motive nozzle,
    wherein the diffuser is connected at a free end of the mixing chamber via a flange connection so as to be detachable and exchangeable,
    wherein the return line is coupled with an outlet tube which is integrated in the hydraulic fluid storage, and wherein the outlet tube is arranged in the hydraulic fluid storage so as to be inclined in a vertical direction and wherein the outlet tube has orifices for passage of the hydraulic fluid and an air outlet orifice at an upper side.

2. The device according to claim 1, wherein the motive medium passing through the at least one motive nozzle is also branched off from preloaded scavenging oil of the at least one hydraulic motor arrangement.

3. The device according to claim 1, wherein the jet pump is configured such that the hydraulic fluid is sucked out independently from a rotational direction of the at least one hydraulic motor arrangement and independently from a driving direction of a loading vehicle or agricultural work machine having the at least one hydraulic motor arrangement.

4. The device according to claim 1, wherein the at least one hydraulic motor arrangement is formed as dual motor arrangement.

5. The device according to claim 1, wherein the at least one hydraulic motor arrangement is connected to the hydraulic fluid storage via an air intake line.

6. The device according to claim 5, wherein the air intake line comprises a check valve that is configured to unblock a throughput depending on a defined vacuum pressure ($\Delta p$) in the at least one hydraulic motor arrangement, and wherein the check valve is spring-loaded to require an opening pressure of up to 1 bar.

7. The device according to claim 1, further comprising a fan and a fan drive associated with the fan, and wherein a further jet pump is associated with the fan drive, the further jet pump being configured to divert a partial stream from a hydraulic circuit of the fan and guide the partial stream to a cooling device.

8. The device according to claim 7, wherein each of the jet pumps draws motive medium from preloaded hydraulic fluid of the fan drive.

9. A loading vehicle comprising the device according to claim 1, and an adjustable length lift arm swivelably movably supported in a carrying structure via at least one lift cylinder, wherein the carrying structure has at least one front undercarriage and at least one rear undercarriage, and wherein the front undercarriage and the rear undercarriage are coupled to one another via a drivetrain, and wherein the carrying structure supports at least one drive motor and at least one central gear unit.

10. The loading vehicle according to claim 9, wherein the loading vehicle is constructed as telescoping loader, forklift or wheel loader.

11. An agricultural work machine in the form of a tractor, harvester or chopper-type forage harvester, comprising the device according to claim 1.

\* \* \* \* \*